July 15, 1941.  H. A. SWEM  2,249,063
FILTER LEAF
Filed May 12, 1938
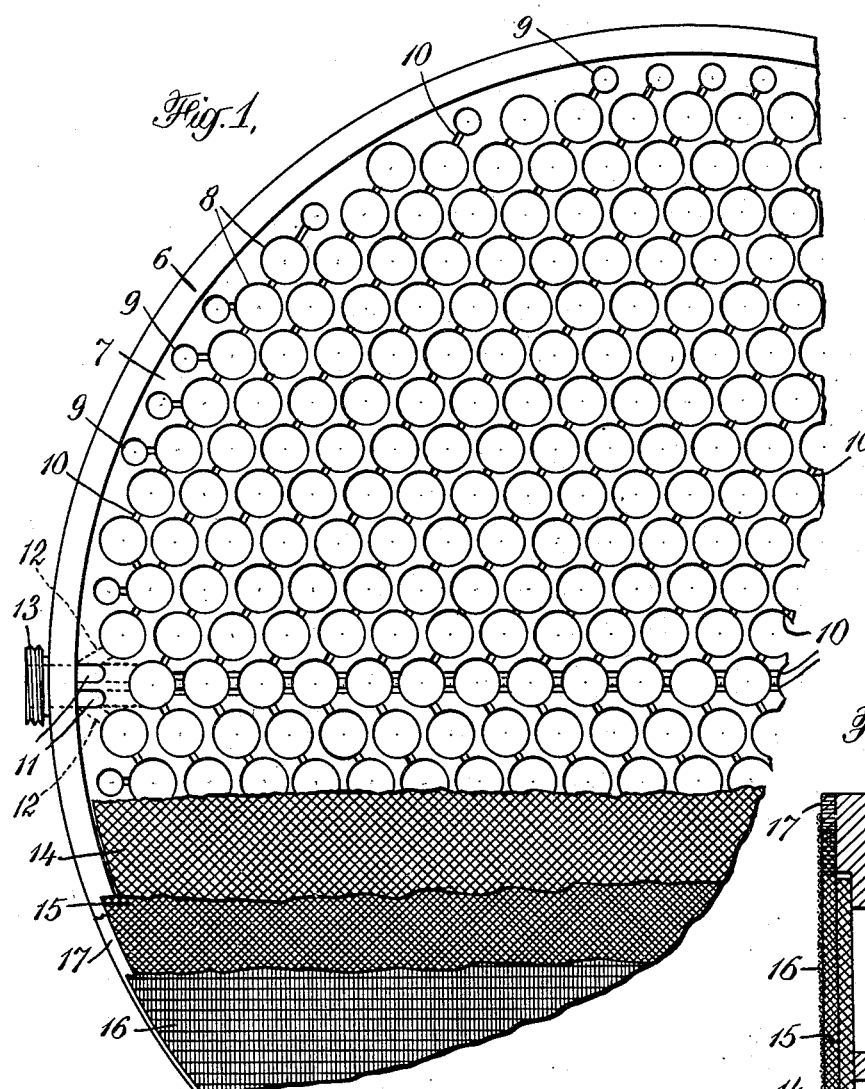
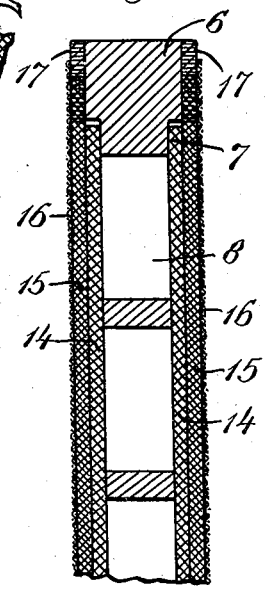
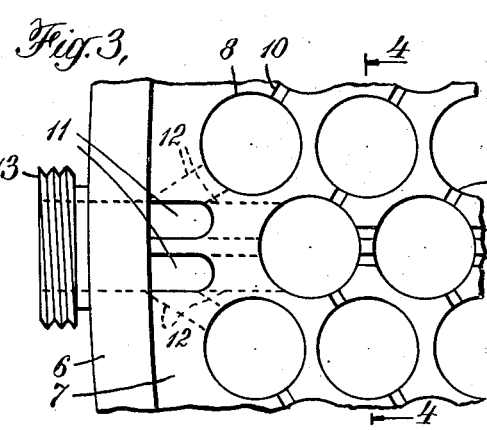
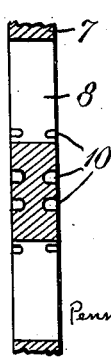
INVENTOR
Harry A. Swem
BY
Pennie, Davis, Marvin, Edmonds
ATTORNEYS Patented July 15, 1941

2,249,063

UNITED STATES PATENT OFFICE 2,249,063

FILTER LEAF

Harry A. Swem, New Gulf, Tex., assignor to Texas Gulf Sulphur Company, a corporation of Texas Application May 12, 1938, Serial No. 207,450

3 Claims. (Cl. 210—195)

This invention relates to leaves or plates for pressure filters, and has for its object the provision of an improved filter leaf. The invention further aims to provide certain improvements in methods of brazing and soldering wire screens to metal frames, as in the fabrication of filter leaves.

The improved filter leaf of the invention is particularly adapted for filtering molten material, such for example as molten sulphur. Sulphur produces by underground fusion and containing an objectionable amount of oil is frequently treated with a contact clay of which about 80% passes through a 325 mesh screen. Attempts have heretofore been made to remove the clay from the treated sulphur by filtering, but serious difficulties have been encountered in the construction of equipment adapted to withstand the severe operating conditions. The required high pressure and the steam-jacketing of all surfaces exposed to the molten sulphur necessitate special features of construction. I use a horizontal steam-jacketed cylinder as the filter shell, and disc filter leaves mounted in vertical planes at right angles to the longitudinal axis of the shell. The filter leaves have individual discharges leading through the flanged cylinder head, for checking individual leaf performance. The filter leaves are mounted in a frame or cage integral with the cylinder head, so that, by means of a suitable track, the cylinder head and leaves can be removed completely from the shell in one operation. The shell, flanged head, leaves, etc., are constructed to withstand a pressure of 225 pounds per square inch. The usual operating pressure is about 150 pounds per square inch. The filter shell is drained by opening valves at the base and top, the cake remaining on the leaves and only partially sluffing off as the leaf cage is withdrawn from the shell. From practical experience with this filter I have found that the filter leaves should meet the following requirements:

1. Absolute rigidity of frame and back-up screens.
2. As near a true plane surface as possible for the fine-mesh filter screen or cloth.
3. Back-up screen (in contact with filter screen) of such mesh that the fine-mesh of the filter screen cannot be distorted by pressure.
4. Solder, where used, to give as high a strength bond as possible at the operating temperature (265 to 318° F.) of the filter.

The present invention aims to provide a filter leaf embodying the foregoing requirements.

Thus, the leaf, in its preferred form, comprises a circular and initially solid metal frame having its opposite faces recessed except for a narrow peripheral rim. The recessed portion of the frame is apertured and channeled to permit the reception of filtrate and the flow thereof to a discharge outlet. A screen of a thickness equal to the depth of the recess is positioned in each recess and confined therein by a second screen in contact therewith and secured (preferably by brazing) to the peripheral rim on that face of the frame. A fine-mesh filter screen covers the second screen on each side of the frame and is secured to the frame, preferably by an antimonial-tin solder composed for the most part of tin and containing about 5–6% of antimony. With a woven wire filter screen of 200 mesh, the back-up screen in contact therewith may advantageously be about 9½ mesh of 16 gauge steel wire.

The back-up screen in contact with the filter screen is preferably fastened to the frame by the improved brazing method of the invention. In accordance with this method, in its complete form, the frame with the screen properly positioned thereon and a superposed metal disc or plate of smaller size than the screen are firmly clamped to a massive metal block. The brazing operation is conducted for short intervals of time at different places around the periphery of the frame, these places being preferably symmetrically positioned, as for example 180° from the starting place, then at a quarter point, next 180° therefrom and so on until the screen is fastened to the frame along its entire periphery. Each interval of brazing is followed by an interval of cooling, so that the complete cycle consists of a number of alternating brazing and cooling intervals. Where the screen is somewhat smaller than the frame, the peripheral portion of the frame beyond the screen is preferably built-up to the thickness of the screen with the brazing metal. The frame, screen and superposed disc are allowed to cool in clamped position. Thereafter, the portion of the screen extending beyond the disc and clamped as before is preferably heated to a dull red heat and simultaneously light hammer blows are imparted near the periphery of the disc to upset the individual wires of the screen to a sufficient extent to impart to the screen a drum-tight plane surface. The frame, screen and superposed disc are again allowed to cool in clamped position, and the operation is repeated until the screen has the desired drum-tight plane surface. When the peripheral portion of the frame has been built-up with brazing metal, excess of the brazing metal is subsequently removed by machining to give the screen and adjacent built-up peripheral portion of the frame a practically true plane surface.

The fine-mesh filter screen is preferably fastened to the frame by the improved soldering method of the invention. In accordance with this method, a moistened pad of absorbent material is superposed on the screen in proper position on the frame. The pad is somewhat smaller than the screen and is held in contact with the screen by a suitable weight, such as a metal disc approximating the size of the pad. The soldering operation is conducted for short intervals alternating with intervals of cooling, in much the same manner as the hereinbefore described brazing operation, until the screen is fastened along its entire periphery to the frame.

The foregoing and other novel features of the invention will be better understood from the following description taken in conjunction with the accompanying drawing, in which:

Fig. 1 is a fragmentary plan view, partly in section, of a filter leaf embodying the novel features of the invention, Fig. 2 is a sectional detail of the filter leaf of Fig. 1, Fig. 3 is a detail plan view of the filtrate outlet, with the screens removed, and Fig. 4 is a sectional detail on the section line 4—4 of Fig. 3.

In describing the filter leaf illustrated in the accompanying drawing, I shall give certain details of configuration, dimensions, screen-meshes, materials and structural features of an actual filter leaf that has given excellent results in the hereinbefore described pressure filter for filtering molten sulphur, but it will, of course, be understood that these details are given merely by way of example and are not to be taken as restrictions or limitations of the invention. In particular, the principles of the invention may be embodied in filter leaves of various shapes and sizes.

The frame or chassis of the filter leaf is a solid disc of sheet steel 27 inches in diameter, ¾ inch thick for ⅝ inch in from the periphery, then recessed on both sides to a depth of 0.111 inch for the remaining surface of the disc. This provides on each side of the disc a narrow peripheral rim 6 and a recessed surface 7. The recessed surface of the disc has numerous small holes or apertures 8 drilled through it, 1 inch in diameter, following a regular pattern, and smaller holes 9 filling in (where necessary) the space between the periphery of the recessed surface and the outside of the regular pattern of 1 inch holes. No holes are drilled within ¼ inch of the recess line. Grooves or channels 10 are cut in the surface between the holes 8 and 9, following a regular pattern, to permit the flow of filtrate to a common discharge outlet 11 in the rim of the disc. The three holes 8 adjacent the outlet 11 are connected thereto by ports 12. A threaded union 13, registering with the outlet 11, is brazed to the rim of the disc.

A relatively coarse-mesh double crimped and rolled wire screen 14 of a thickness equal to the depth of the recess is positioned in the recess on each side of the disc. The screen 14 is about 25½ inches in diameter (slightly less than the diameter of the recess), and may advantageously be 8 mesh of 16 gauge steel wire, flat-rolled to 0.111 inch. A somewhat finer mesh (about 9½ mesh) screen 15 covers the inner screen 14, overlapping the latter about one-half inch and secured by brazing to the peripheral rim 6. The screen 15 is 26½ inches in diameter and is also a double crimped and rolled wire screen made of 16 gauge steel wire, flat rolled to a thickness of 0.111 inch.

The two screens 14 and 15 constitute inner and outer back-up screens for a filter screen or cloth 16. The filter screen 16 is 26¾ inches in diameter and may advantageously be a 200 mesh stainless metal woven wire screen or cloth, the wires being of a diameter less than 0.008 inch. The filter screen 16 is sweat-soldered to the brazed peripheral rim of the outer back-up screen 15 and to the annular rim of brazed metal 17, as will be more particularly described hereinafter.

In brazing the screen 15 to the disc care must be taken to minimize warping of both the screen and the disc, due to the heat of the brazing operation, and corrective measures should be taken to correct such warping as almost inevitably occurs. These ends are attained, in accordance with the improved brazing method of the invention, by firmly clamping three filter discs, singly and in a horizontal position, to a massive cast steel block, say approximately 6 feet square and 6 inches thick, provided with appropriately positioned clamp holes. The screens 14 are then placed in the recessed portions of the discs, and the screens 15 are laid on top, centered, and held in place by means of a steel disc, 23 inches in diameter and 1 inch thick; the steel discs being firmly clamped to the steel block.

The welder first tacks each screen 15 in place by brazing spots at 90° intervals along the periphery of the screen. Brazing then proceeds on the three filter discs in rotation, about 5 minutes brazing time being allowed on any one screen. The welder's schedule per filter disc, as he moves to it in turn, is as follows: place of beginning, thence 180°, thence a quarter point, thence 180°, and so on. To hasten cooling, compressed air is blown on the freshly brazed portion, when the welder moves to the next filter disc. When the brazing on a filter disc is completed, the disc is allowed to cool in the clamped position, and the clamps are removed when the disc is cold. With this method the disc itself warps but slightly, and can be brought back to shape cold by a few light hammer blows.

Two warping effects tend to develop in the screen 15, due to the heat of the brazing operation. The most frequent is that the screen surface becomes convex, in some cases rising as much as ⅜ inch at the center. The second effect are wave-like irregularities in the surface, not concentric, but more nearly parallel to a diameter of the disc. Both effects are corrected, in accordance with the method of the invention, as follows: The disc is again clamped to the steel block, the same as when the original brazing was being done. Two welder's torches, spaced 180° apart, are used to bring the exposed portion of the screen 15, between the 23-inch steel disc and the inner edge of the brazing, to a dull red heat. While maintaining this exposed portion of the screen at a dull red heat, two men, positioned 180° part, strike light blows near the periphery of the 23-inch steel disc. The men slowly rotate their blows around. After circling the disc two or three times with these light hammer blows, the filter disc is allowed to cool, unclamped and examined. It generally takes from 3 to 6 heats to work the screen 15 down to a drum-tight plane surface.

The principle involved in the foregoing procedure for correcting warping of the screen 15 is a gradual upsetting of the individual wires of the screen. This is materially promoted by the steady pressure applied through the 23-inch steel disc, and by the light hammer blows around its periphery. Care should be taken that upsetting of the wires of the screen 15 does not all take place in any one short segment, since otherwise short pressure ridges will develop, and these will materially shorten the useful life of the screen.

The screen 15 is brazed to the rim 6 of the filter disc from about ¼ inch in from its periphery and thence to the outer edge of the rim, thus giving an annular brazed surface ½ inch wide. The surface of the rim 6 is built-up with the brazed metal (bronze) to a slightly greater thickness than the thickness (0.111 inch) of the screen 15. Brazing in this manner serves three functions, viz: (1) to secure or fasten the screen to the disc, (2) to provide a surface easily tinned for soldering of the filter screen, (3) to provide, with a minimum amount of machining, a practically true plane surface from edge to edge of the filter leaf.

The filter leaf is next placed in a lathe and all excess brazing is removed by machining, so that both sides of the leaf are as near true planes as possible. The brazed portion of each screen 15 (¼ inch in from its periphery) now has no bronze on the surface, but the mesh openings are filled with bronze. The remainder of the rim 6 to its outer edge is a solid bronze surface (17 of Figs. 1 and 2).

The filter screen 16 is sweat-soldered to the brazed peripheral surface of the disc (and screen 15) by an antimonial-tin solder. Preferably, the solder is made up of 5½% antimony and 94½% tin, and an acidless flux in liquid form is used. The brazed surface (including the small squares of bronze left in the meshes of the screen 15) is thoroughly cleaned and tinned with the antimonial-tin solder. All excess solder is scraped and sanded off, so that the tinned coat is about 0.01 inch in thickness. The leaf is then washed in water and then in alcohol. The filter screen 16 (26¾ inches in diameter) is washed in alcohol to remove the oils used while weaving, and is then tinned, using as thin a coat as possible, on one side only for a distance of ⅜ inch in from the periphery. This fine-mesh screen is not scrapped or sanded, for fear of displacing the "shoot" wires.

The filter screen 16 is placed, tinned side down, upon the screen 15, and centered. A moist asbestos pad, 24 inches in diameter and ¼ inch thick, is placed on top of the filter screen. One of the aforementioned 23-inch steel discs is placed on top of the asbestos pad, but not clamped down. Warping of the filter screen during the sweat-soldering operation is thus prevented.

The filter screen is first sweated in position, using ten pound soldering irons, at four points 90° apart. Soldering by the sweating method then proceeds, 2 inches at a time being soldered along the circumference, moving from the place of beginning to a point 180°, then a quarter point, then 180°, and so on. Soldered places are promptly cooled by small amounts of clean water. Once started, the soldering is carried on to completion. When the filter screen has been thus soldered to the rim 6, the leaf is immediately washed in water, given an alcohol bath and air dried. Another filter screen 16 is then similarly soldered to the opposite side of the leaf. In this manner the filter screens are secured to the opposite faces of the leaf without warping. The method of brazing a wire screen to a metal frame described herein is claimed in my application Serial No. 283,833, filed July 11, 1939.

Care should be taken to prevent corrosion of the filter screen in the completed filter leaf. Moisture accelerates the corrosion. Even after careful washing and drying, corrosion is likely to take place under ordinary atmospheric conditions. For these reasons, it is desirable to place the filter leaf in service as soon as possible after fabrication. When thus placed in service promptly after fabrication, it has been found that corrosion is inhibited, or the corrosive elements are cleaned from the leaf, and no future trouble is experienced from corrosion.

The filter leaf of the invention has given excellent results in actual service in a pressure filter of the type hereinbefore described filtering molten sulphur. The sulphur fed to the filter contained a combined total by weight of about 0.16% of contact clay and a filter aid, and the filtered product contained only 0.0002% of the clay, etc. The filter leaves have been in continuous use without change for over a year with only slight, if any, evidence of wear and no evidence of plugging. The average filter rate for this period has been approximately 0.5 long ton of sulphur per square foot per filter hour.

I claim:

1. A filter leaf comprising a circular metallic disc, each face of the disc being recessed except for a relatively narrow rim at the periphery thereof, the recessed portion of said disc being honey-combed with apertures communicating with one another and with a filtrate discharge opening in the disc, a relatively coarse-mesh wire screen of a thickness equal to the depth of the recess positioned in each recess, a wire screen of finer mesh than said coarse-mesh screen covering each of the latter screens and secured by brazing to the peripheral rim on that face of the disc, and a fine-mesh wire filter screen soldered to the brazed peripheral rim surface of each face of said disc.

2. A filter leaf comprising a circular and initially solid metal frame having its opposite faces recessed except for a narrow peripheral rim, the recessed portion of said frame being apertured and channeled to permit the reception of filtrate and the flow thereof to a discharge outlet at the periphery of the frame, a relatively coarse-mesh screen of a thickness approximately equal to the depth of the recess and of a diameter slightly less than the diameter of the recess positioned in each recess, an outer screen of finer mesh than said inner screen and of a diameter sligthly greater than the diameter of the recess covering each of said inner screens and brazed to the peripheral rim on that face of the frame to present a drum-tight plane surface, and a fine-mesh filter screen of slightly greater diameter than the diameter of said outer screen and covering each of the latter and secured by soldering to the peripheral rim on that side of the frame.

3. A filter leaf comprising a circular and initially solid metal frame having its opposite faces recessed except for a narrow peripheral rim, the recessed portion of said frame being apertured and channeled to permit the reception of filtrate and the flow thereof to a discharge outlet at the periphery of the frame, a relatively coarse-mesh screen of a thickness approximately equal to the depth of the recess and of a diameter slightly less than the diameter of the recess positioned in each recess, an outer screen of finer mesh than said inner screen and of a diameter slightly greater than the diameter of the recess but smaller than the diameter of the frame covering each of said inner screens and secured by brazing to the peripheral rim on that side of the frame and presenting a drum-tight plane surface, the portions of said peripheral rims beyond the periphery of the outer screen being built-up to the thickness of the screen with the brazing metal, and a fine-mesh filter screen of slightly greater diameter than the diameter of said outer screen but smaller than the diameter of said frame covering each of the outer screens and secured by soldering to the brazed metal surface of the peripheral rim on that side of the frame.

HARRY A. SWEM.